(12) United States Patent
Walsh

(10) Patent No.: US 7,041,411 B2
(45) Date of Patent: May 9, 2006

(54) METHOD AND APPARATUS FOR COLLECTING CONDENSATE FROM COMBUSTIBLE GAS STREAMS IN AN INTEGRATED FUEL CELL SYSTEM

(75) Inventor: Michael M. Walsh, Fairfield, CT (US)

(73) Assignee: Plug Power Inc., Latham, NY (US)

( * ) Notice: Subject to any disclaimer, the term of this patent is extended or adjusted under 35 U.S.C. 154(b) by 459 days.

(21) Appl. No.: 10/209,693

(22) Filed: Jul. 31, 2002

(65) Prior Publication Data

US 2003/0044670 A1   Mar. 6, 2003

Related U.S. Application Data

(60) Provisional application No. 60/309,080, filed on Jul. 31, 2001.

(51) Int. Cl.
*H01M 8/00* (2006.01)
*H01M 2/00* (2006.01)

(52) U.S. Cl. .......................................... 429/34; 429/13

(58) Field of Classification Search .................. 429/17, 429/24, 20, 25, 34, 26, 9, 22, 19, 13, 23, 429/38, 16, 5, 30, 46; 166/267; 95/143; 422/5; 424/401; 137/247.39, 192; 250/287; 210/776; 261/28; 426/231; 96/406, 168; 47/1.43; 60/286; 204/252; 405/37; 156/287; 123/55.5; 219/201; 4/14.4, 301
See application file for complete search history.

(56) References Cited

U.S. PATENT DOCUMENTS

| | | | | |
|---|---|---|---|---|
| 3,493,050 A | * | 2/1970 | Kork et al. ................. | 166/267 |
| 4,192,988 A | * | 3/1980 | Pederson et al. ........... | 219/201 |
| 5,837,393 A | * | 11/1998 | Okamoto ..................... | 429/20 |
| 6,110,613 A | * | 8/2000 | Fuller .......................... | 429/17 |
| 6,541,141 B1 | * | 4/2003 | Frank et al. ................. | 429/17 |
| 2002/0094467 A1 | * | 7/2002 | Nonobe et al. .............. | 429/34 |

* cited by examiner

*Primary Examiner*—Michael Barr
*Assistant Examiner*—Robert Hodge

(74) *Attorney, Agent, or Firm*—Trop, Pruner & Hu, P.C.

(57) ABSTRACT

The invention generally relates to a method and apparatus for collecting condensate from combustible gas process streams in an integrated fuel cell system. In one aspect, a water management subsystem for a fuel cell system has a first conduit containing a first gas at a first pressure. A first water trap is provided that is configured to receive condensate from the first conduit. A second conduit is provided that contains a second gas at a second pressure. A second water trap is provided that is configured to receive condensate from the second conduit and the first water trap.

12 Claims, 4 Drawing Sheets

METHOD AND APPARATUS FOR COLLECTING CONDENSATE FROM COMBUSTIBLE GAS STREAMS IN AN INTEGRATED FUEL CELL SYSTEM

CROSS REFERENCE TO RELATED APPLICATIONS

This application claims priority under 35 USC 119(e) from U.S. Provisional Application No. 60/309,080, filed Jul. 31, 2001, naming Walsh as inventor, and titled "METHOD AND APPARATUS FOR COLLECTING CONDENSATE FROM COMBUSTIBLE GAS STREAMS IN AN INTEGRATED FUEL CELL SYSTEM." That application is incorporated herein by reference in its entirety and for all purposes.

BACKGROUND

The invention generally relates to a method and apparatus for collecting condensate from combustible gas process streams in an integrated fuel cell system.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

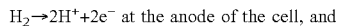
$H_2 \rightarrow 2H^+ + 2e^-$ at the anode of the cell, and

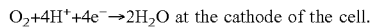
$O_2 + 4H^+ + 4e^- \rightarrow 2H_2O$ at the cathode of the cell.

A typical fuel cell has a terminal voltage of up to about one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow field channels and orifices to, as examples, route the reactants and products through the fuel cell stack. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow field channels and diffuse through the GDLs to reach the PEM. The PEM and its adjacent pair of catalyst layers are often referred to as a membrane electrode assembly (MEA). An MEA sandwiched by adjacent GDL layers is often referred to as a membrane electrode unit (MEU).

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may monitor the output power of the stack and based on the monitored output power, estimate the fuel flow to satisfy the appropriate stoichiometric ratios. In this manner, the controller regulates the fuel processor to produce this flow, and in response to the controller detecting a change in the output power, the controller estimates a new rate of fuel flow and controls the fuel processor accordingly.

The fuel cell system may provide power to a load, such as a load that is formed from residential appliances and electrical devices that may be selectively turned on and off to vary the power that is demanded by the load. Thus, the load may not be constant, but rather the power that is consumed by the load may vary over time and abruptly change in steps. For example, if the fuel cell system provides power to a house, different appliances/electrical devices of the house may be turned on and off at different times to cause the load to vary in a stepwise fashion over time. Fuel cell systems adapted to accommodate variable loads are sometimes referred to as "load following" systems.

Fuel cells generally operate at temperatures much higher than ambient (e.g., 50–80° C. or 120–180° C.), and the fuel and air streams circulated through the fuel cells typically include water vapor. For example, reactants associated with sulphonated fluorocarbon polymer membranes must generally be humidified to ensure the membranes remain moist during operation. In such a system, water may condense out of a process stream where the stream is cooled below its dew point. For example, if the anode and cathode exhaust streams are saturated with water vapor at the stack operating temperature, water will tend to condense from these streams as they cool after leaving the stack. Similarly, the humidity and temperature conditions of other process streams may also produce condensation. It may be desirable to remove condensate from a process stream in a fuel cell system process stream. As examples, such condensate can interfere with the flow of process streams, can potentially build to levels that can flood portions of the system, and can also cause problems if allowed to freeze (e.g., in an outdoor unit that is not in service).

The term "integrated fuel cell system" (also commonly referred to simply as "fuel cell system") generally refers to a fuel cell stack that is coupled to components and subsystems that support the operation of the stack. For example, this could refer to a fuel cell stack that is connected to a power conditioning device that converts direct current from the fuel cell into alternating current similar to that available from the grid. It might also refer to a system equipped with a fuel processor to convert a hydrocarbon (e.g., natural gas, propane, methanol, etc.) into a hydrogen rich stream (e.g., reformate) for use in the fuel cell. An integrated fuel cell system may also include a control mechanism to automate at least some portion of the operation of the system. Integrated fuel cell systems may include a single controller common to the entire system, or may include multiple controllers specific to various parts of the system. Likewise, the operation of integrated fuel cell systems may be fully or partially automated. Also, an integrated fuel cell system may or may not be housed in a common enclosure.

There is a continuing need for integrated fuel cell systems and associated process methods designed to achieve objectives including the forgoing in a robust, cost-effective manner.

SUMMARY

The invention generally relates to a method and apparatus for collecting condensate from combustible gas process streams in an integrated fuel cell system. In one aspect, a water management subsystem for a fuel cell system has a first conduit containing a first gas at a first pressure. A first water trap is provided that is configured to receive condensate from the first conduit. A second conduit is provided that contains a second gas at a second pressure. A second water trap is provided that is configured to receive condensate from the second conduit and the first water trap. In some embodiments, the first pressure is greater than the second pressure.

In various embodiments, the first gas can include, as examples, hydrogen, reformate, a fuel cell inlet fuel stream, etc. Likewise, the second gas can include, as examples, hydrogen, reformate, a fuel cell exhaust fuel stream, etc. In some embodiments, a water tank is provided to receive condensate from the second water trap.

In the context of this invention, the term water trap is used to indicate a means of separating liquid water from a gas stream. Water traps can include, as examples, float valves, water trap bends ("j-traps", "p-traps," etc.), water permeable membranes, or other configurations know in the art to facilitate water removal from a gas stream.

In some embodiments, first water trap has a condensate outlet having a third pressure less than the second pressure. This arrangement thus prevents condensate from being blown from the first water trap into the second gas conduit, since it is desired that the condensate from the first gas conduit eventually flow through the second water trap after having first flowed through the first water trap.

In another aspect, the invention provides another water management subsystem for a fuel cell system. A fuel cell stack is provided that has a fuel inlet conduit and a fuel exhaust conduit. The fuel cell stack has a fuel inlet port connected to the fuel inlet conduit and a fuel exhaust port connected to the fuel exhaust conduit. The fuel inlet conduit contains a fuel gas, and the fuel exhaust conduit contains an exhaust gas (which generally contains some amount of residual unreacted fuel). The fuel gas has a first pressure that is greater than a second pressure of the exhaust gas. A first water trap is provided that has a first inlet and a first outlet. Similarly, a second water trap is provided that has a second inlet and a second outlet.

A first drain conduit is connected in fluid communication at a first end to the fuel inlet conduit, and further connected in fluid communication at a second end to the first inlet of the first water trap. A second drain conduit is connected in fluid communication at a first end to the fuel exhaust conduit, and further connected in fluid communication at a second end to the second inlet of the second water trap. A third drain conduit is connected in fluid communication at a first end to the first outlet of the first water trap, and further connected in fluid communication at a second end to the second drain conduit.

Some embodiments may further include a gas flow limiting orifice in the first drain conduit or second drain conduit, or both. Such an orifice can include, as an example, smaller opening than the general cross-sectional area of the gas conduit, such that gas flow through the orifice tends to be restricted, particularly at higher pressures or flow rates.

In another aspect, the invention provides another water management subsystem for a fuel cell system. A first process stream conduit and a first water trap are provided. The first water trap has an inlet and an outlet. The first process stream conduit contains a combustible gas. The first process stream conduit is connected in fluid communication to the inlet of the first water trap. A second water trap is provided that also has an inlet and an outlet. The inlet of the second water trap is connected in fluid communication with the outlet of the first water trap. A water collection tank is also provided in fluid communication with the outlet of the second water trap.

In some embodiments, the system may further include a second process stream conduit connected in fluid communication with the inlet of the second water trap. As in previous configurations, in some embodiments the first process stream conduit has a first pressure greater than a second pressure of the second process stream conduit.

In another aspect, the invention provides a method of managing water in a fuel cell system, including at least the following steps: (1) flowing an inlet fuel gas containing liquid water to a fuel cell stack; (2) exhausting an outlet fuel gas containing liquid water from the fuel cell stack; (3) draining at least a portion of the liquid water in the inlet fuel gas to a first water trap; (4) draining at least a portion of the liquid water in the outlet fuel gas to a second water trap; and (5) exhausting liquid water from the first water trap to the second water trap.

Additional embodiments of such methods may further include additional steps, either alone or in combination, such as maintaining an outlet pressure of the first water trap less than a pressure of the outlet fuel gas. In some embodiments, the step of exhausting liquid water from the first water trap to the second water trap includes the step of exhausting liquid water directly from the first water trap to the second water trap. Embodiments of methods under the invention may also include draining liquid water from the second water trap to a water collection tank.

In another aspect, the invention provides another method of managing water in a fuel cell system, including the following steps: (1) flowing a first gas through a first conduit; (2) flowing a second gas through a second conduit; (3) draining liquid water from the first conduit to an inlet of a first water trap; (4) draining liquid water from the second conduit to an inlet of the second water trap; and (5) draining liquid water from an outlet of the first water trap to the inlet of the second water trap.

Additional embodiments of the invention can also include any of the other features described herein, either alone or in combination.

Advantages and other features of the invention will become apparent from the following description, drawings and claims.

DETAILED DESCRIPTION

Figure 1:
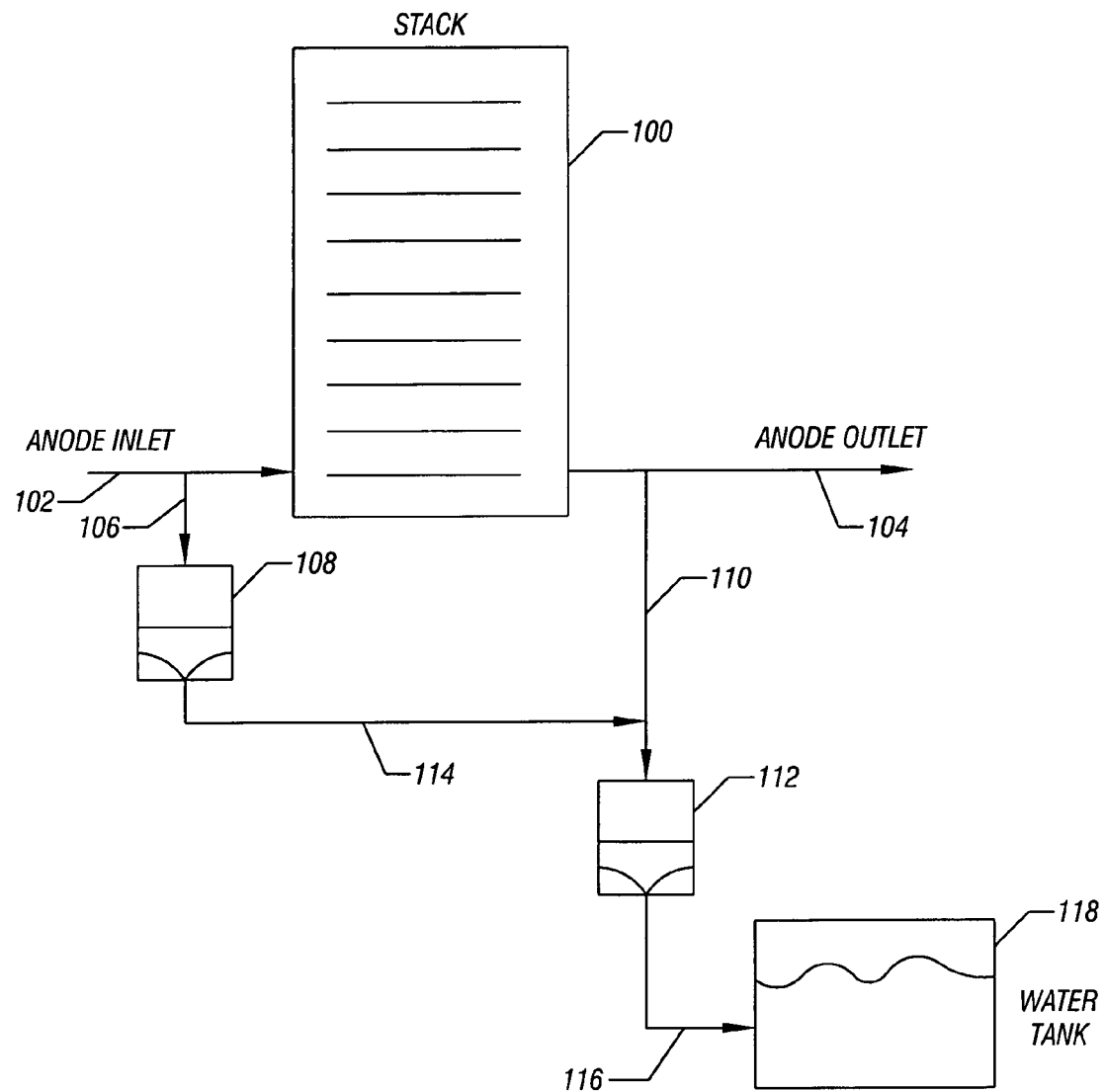
FIG. 1 is a schematic representation of an apparatus for collecting condensate in an integrated fuel cell system.

In general, in one embodiment, an apparatus is provided for collecting condensate from a combustible gas stream in an integrated fuel cell system. As examples, a combustible gas stream may be any reformate, hydrogen, or other combustible gas stream that is utilized or exhausted from a fuel cell system. The combustible gas stream contains condensate, which is removed through a drain line that empties into a first water trap. As an example, the water trap can be a gravity-biased float valve wherein water entering the trap causes a float valve to open as it floats away from a drain orifice. When there is no water in the trap, the float valve is closed via gravity or spring such that gas is prevented from flowing through the trap. The water trap can also be a j-trap that maintains a height of water sufficient to prevent the combustible gas stream from blowing through the trap.

Condensate is similarly drained from a second gas stream that has a lower pressure than the combustible gas stream. In some embodiments, the second gas stream can be another gas stream containing combustible components, while in other embodiments it can be a non-combustible stream such as air. In some embodiments, the combustible gas stream can be an anode inlet stream, and the second gas stream can be an anode outlet stream. In this example, the anode outlet stream is at a lower pressure than the anode inlet stream due to the pressure drop through the stack.

The condensate from the second gas stream is drained into a second water trap. The outlet of the first water trap is also drained into the inlet of the second water trap. In some embodiments, the outlet of the second water trap is drained into a water accumulation tank. This arrangement provides an advantage in that the high pressure combustible gas stream is less likely to be able to bypass the water traps, since the gas must pass through two water traps. In embodiments where the second water trap drains into an accumulation tank, this makes it more difficult for potentially explosive gas mixtures to collect in the atmosphere of the tank. In such embodiments, it may also be preferable to continually purge the atmosphere of the tank to provide further protection. Another advantage is that the arrangement described above reduces the plumbing associated with the water accumulation tank or other destination employed for the second water trap (e.g., sanitary drain, etc.).

In another embodiment, a method is provided for collecting condensate from a combustible gas stream in an integrated fuel cell system. One particular embodiment includes at least the following steps: (1) flowing an inlet fuel gas (e.g., anode feed gas) containing liquid water (e.g., condensate) to a fuel cell stack; (2) exhausting an outlet fuel gas (e.g., anode exhaust) containing liquid water from the fuel cell stack; (3) draining a portion of the liquid water in the inlet fuel gas to a first water trap; (4) draining a portion of the liquid water in the outlet fuel gas to a second water trap; and (5) exhausting liquid water from the first water trap to the second water trap.

Further embodiments may include any of the following additional steps, either alone or in combination: cooling the inlet fuel gas to produce condensate; cooling the outlet fuel gas to produce condensate; exhausting liquid water from the second water trap to a water accumulation tank; and maintaining the inlet fuel gas at a higher pressure than the outlet fuel gas.

Referring to FIG. 1, a fuel cell stack 100 has an anode inlet stream 102 and an anode exhaust stream 104. The anode inlet stream 102 has a drain line 106 connected to it that feeds into a first water trap 108. The anode exhaust stream 104 has a drain line 110 that feeds into a second water trap 112. The first water trap 108 has a drain line 114 that also feeds into the second water trap 112. The second water trap 112 has a drain line 116 that feeds into water tank 118.

Figure 2:
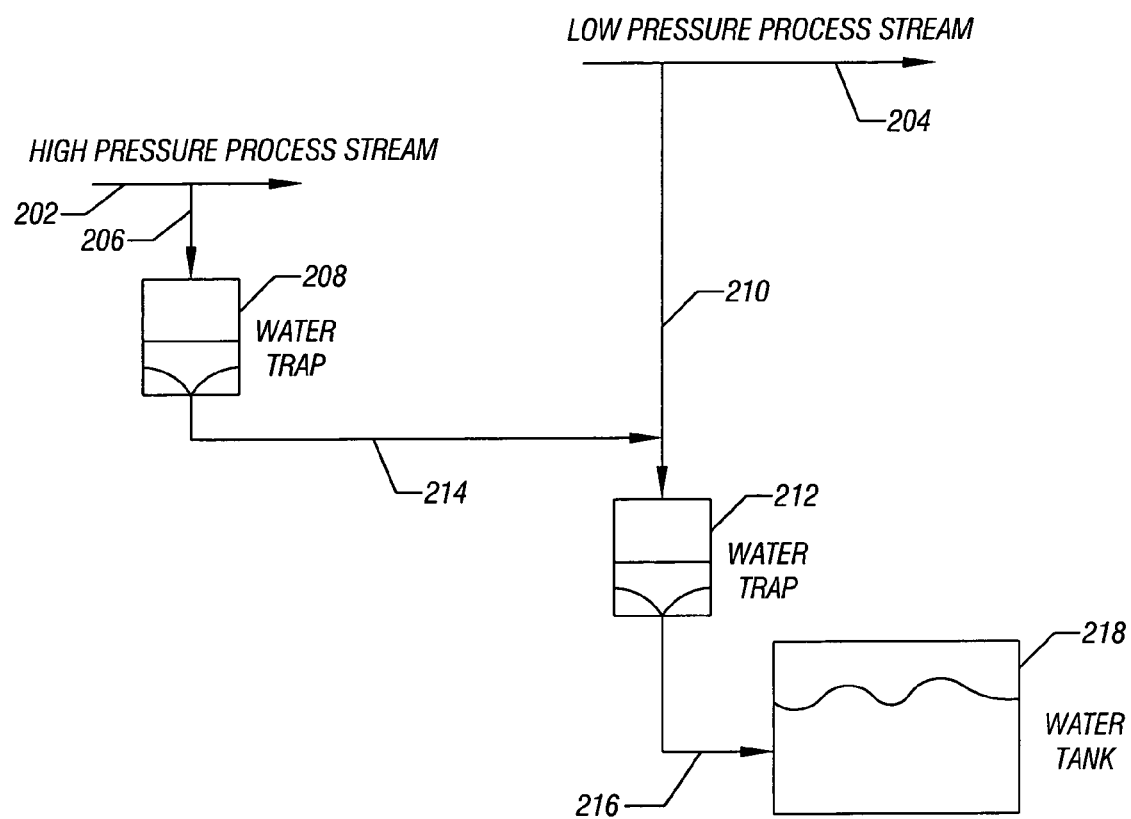
FIG. 2 is a schematic representation of an apparatus for collecting condensate in an integrated fuel cell system.

Referring to FIG. 2, a relatively high pressure (e.g., 1 psig) combustible process stream 202 has a drain line 206 that feeds into a first water trap 208. A relatively lower pressure (e.g., 0.3 psig) process stream 204 has a drain line 210 connected to it that feeds a second water trap 212 via drain line 210. The first water trap 208 also feeds the second water trap 212 via drain line 214. The second water tap 212 feeds a water tank 218 via drain line 216.

Figure 3:
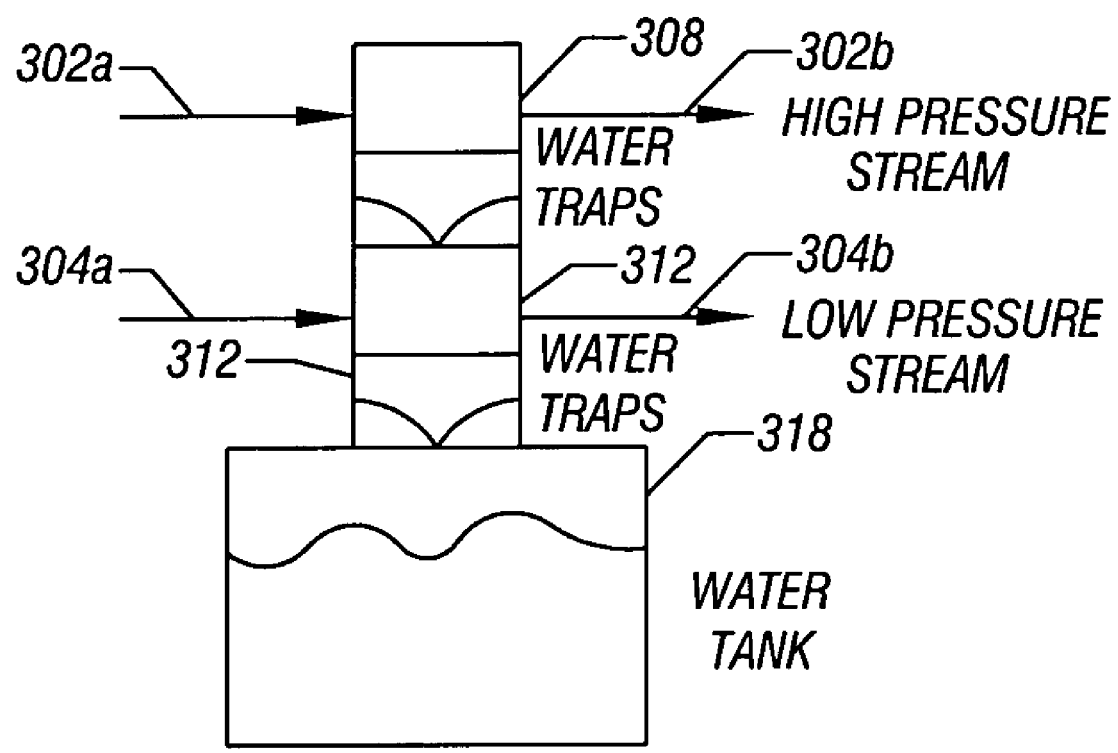
FIG. 3 is a schematic representation of an apparatus for collecting condensate in an integrated fuel cell system.

Referring to FIG. 3, a more integrated embodiment is shown wherein a relatively high pressure combustible process stream 302a enters a first water trap 308 and exits the trap 308 as stream 302b. The first water trap 308 feeds directly into a second water trap 312. A relatively lower pressure process stream 304a enters the second water trap 312 and exits the trap 312 as stream 304b. The second water trap 312 feeds directly into a water tank 318. Thus, in this embodiment, the need is eliminated for many of the drain lines described with respect to the embodiments shown in FIGS. 1 and 2. The elimination of such plumbing may offer an advantage in that such embodiments are smaller, lighter, and cheaper to manufacture. Other embodiments are possible where the components described above are only partially integrated (e.g., some of the drain lines associated with them remain).

Figure 4:
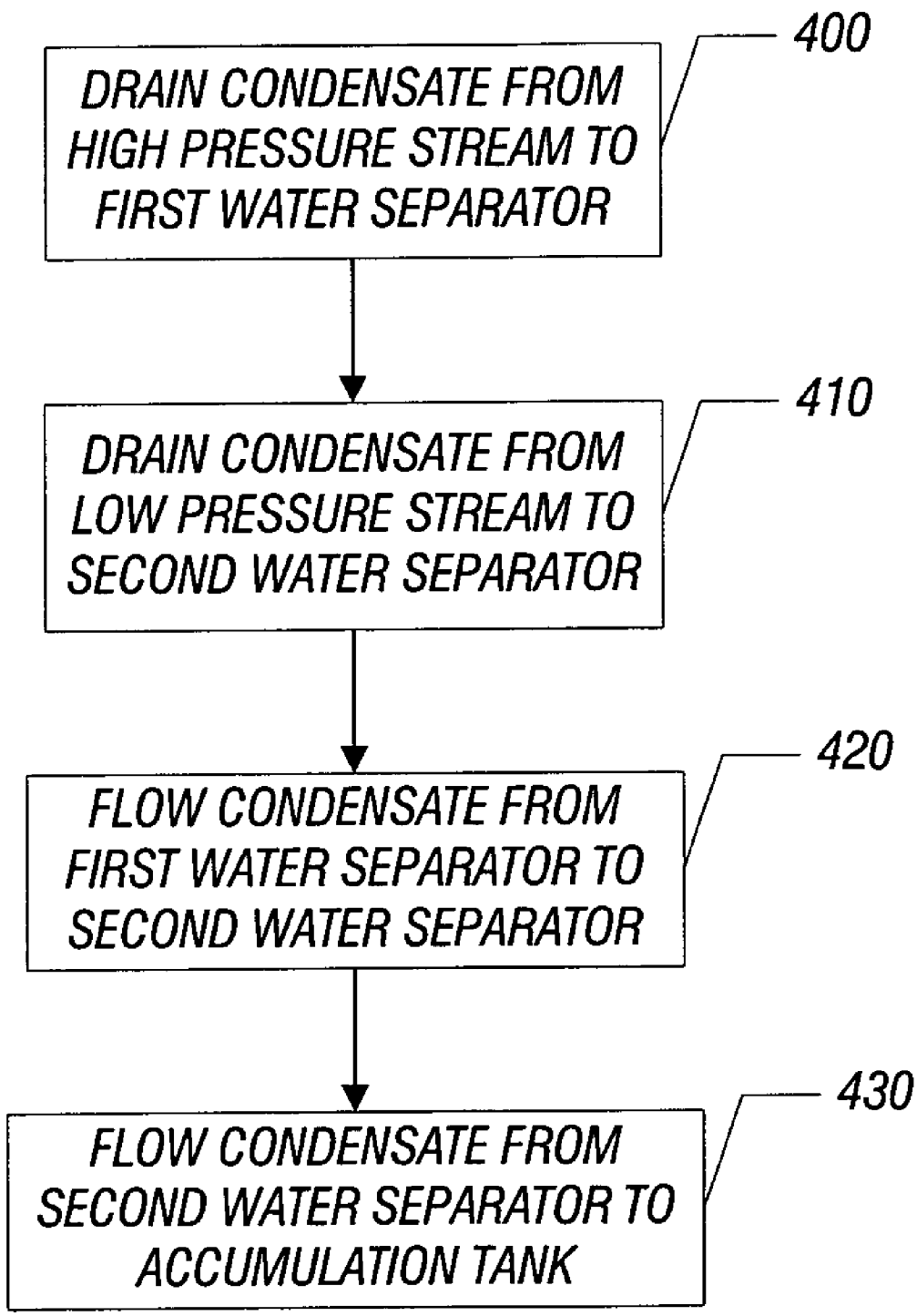
FIG. 4 is a flow chart of a method for collecting condensate in an integrated fuel cell system.

Referring to FIG. 4, a method is provided based on the design principles discussed above. The steps include: (400) draining a first condensate from a relatively high pressure stream to a first water trap; (410) draining a second condensate from a relatively lower pressure stream to a second water trap; (420) draining condensate from the first water separator to the second water separator; and (430) draining the condensate (combined from the high and low pressure streams) from the second water separator to an accumulation tank.

Further embodiments of the invention may include apparatus and methods based on any combination of the features and aspects described above.

While the invention has been disclosed with respect to a limited number of embodiments, those skilled in the art, having the benefit of this disclosure, will appreciate numerous modifications and variations therefrom. It is intended that the invention covers all such modifications and variations as fall within the true spirit and scope of the invention.

What is claimed is:

1. A water management subsystem for a fuel cell system, comprising:

a fuel cell stack, a fuel inlet conduit and a fuel exhaust conduit, the fuel cell stack having a fuel inlet port connected to the fuel inlet conduit and a fuel exhaust port connected to the fuel exhaust conduit, the fuel inlet conduit containing a fuel gas and the fuel exhaust conduit containing an exhaust gas;

wherein the fuel gas has a first pressure and the exhaust gas has a second pressure, wherein the first pressure is greater than the second pressure;

a first water trap having a first inlet and a first outlet, and a second water trap having a second inlet and a second outlet;

a first drain conduit connected in fluid communication at a first end to the fuel inlet conduit, and further connected in fluid communication at a second end to the first inlet of the first water trap;

a second drain conduit connected in fluid communication at a first end to the fuel exhaust conduit, and further connected in fluid communication at a second end to the second inlet of the second water trap; and a third drain conduit connected in fluid communication at a first end to the first outlet of the first water trap, and further connected in fluid communication at a second end to the second drain conduit.

2. The water management subsystem of claim 1, further comprising a gas flow limiting orifice in the first drain conduit.

3. The water management subsystem of claim 1, further comprising a gas flow limiting orifice in the second drain conduit.

4. The water management subsystem of claim 1, wherein at least one of the first and second water traps comprise a float valve.

5. The water management subsystem of claim 1, wherein at least one of the first and second water traps comprise a conduit forming a water trap bend.

6. The water management subsystem of claim 1, further comprising a water tank adapted to receive condensate from the second outlet of the second water trap.

7. A method of managing water in a fuel cell system, comprising:
   flowing an inlet fuel gas containing liquid water to a fuel cell stack;
   exhausting an outlet fuel gas containing liquid water from the fuel cell stack;
   draining at least a portion of the liquid water in the inlet fuel gas to a first water trap;
   draining at least a portion of the liquid water in the outlet fuel gas to a second water trap; and
   exhausting liquid water from the first water trap to the second water trap.

8. The method of claim 7, further comprising:
   maintaining an outlet pressure of the first water trap less than a pressure of the outlet fuel gas.

9. The method of claim 7, wherein the step of exhausting liquid water from the first water trap to the second water trap comprises exhausting liquid water directly from the first water trap to the second water trap.

10. The method of claim 7, further comprising:
    draining liquid water from the second water trap to a water collection tank.

11. A method of managing water in a fuel cell system, comprising:
    flowing a first gas through a first conduit;
    flowing a second gas through a second conduit;
    draining liquid water from the first conduit to an inlet of a first water trap;
    draining liquid water from the second conduit to an inlet of the second water trap;
    draining liquid water from an outlet of the first water trap to the inlet of the second water trap; and
    maintaining an outlet pressure of the first water trap less than a pressure of the second conduit.

12. The method of claim 11, further comprising:
    draining liquid water from the second water trap to a water collection tank.

* * * * *